Figure 1:
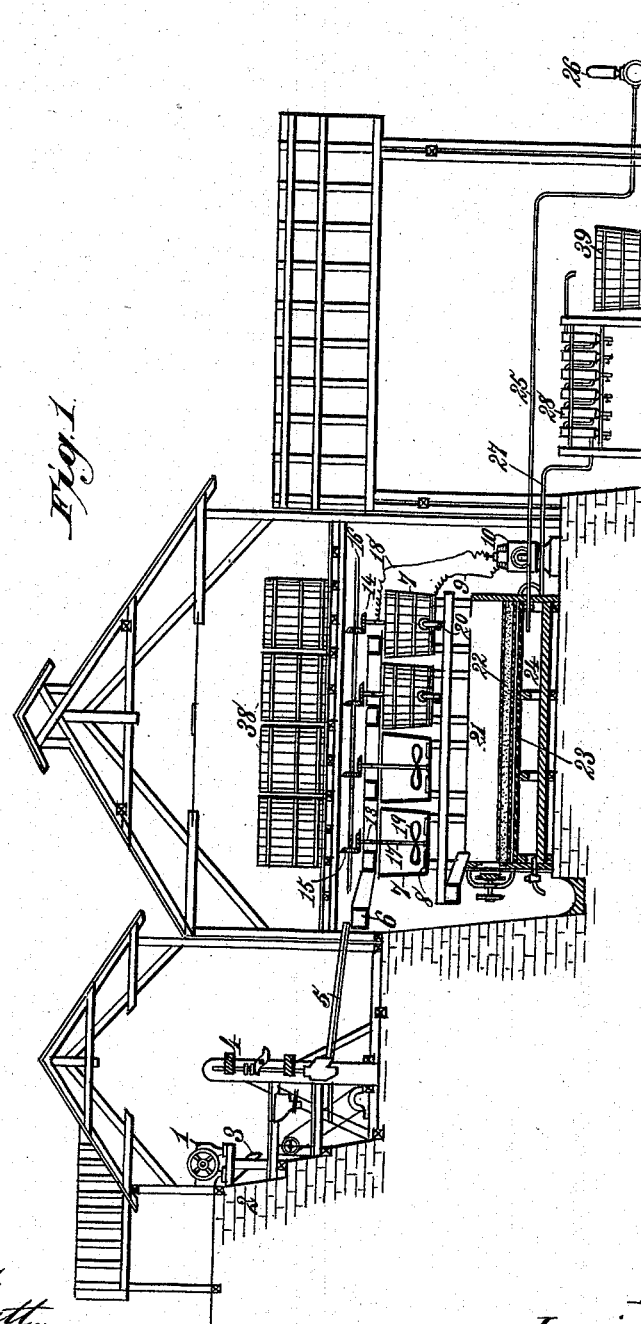

(No Model.)
2 Sheets—Sheet 1.

L. PELATAN & F. CLERICI.
EXTRACTING GOLD FROM ITS ORES.

No. 528,023.  Patented Oct. 23, 1894.

Witnesses.
Robt Cruitt,
Thos. A. Green

Inventors.
Louis Pelatan.
Fabrizio Clerici.
By James L. Norris.
Atty.

(No Model.) 2 Sheets—Sheet 2.
L. PELATAN & F. CLERICI.
EXTRACTING GOLD FROM ITS ORES.
No. 528,023. Patented Oct. 23, 1894.
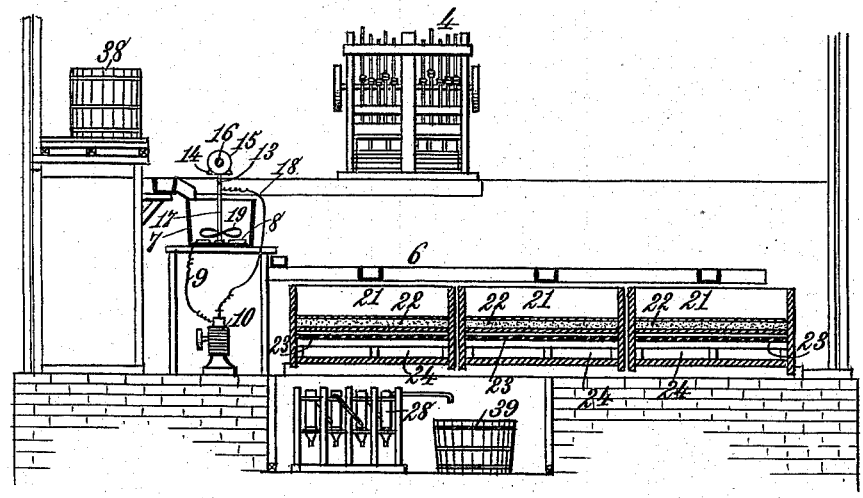
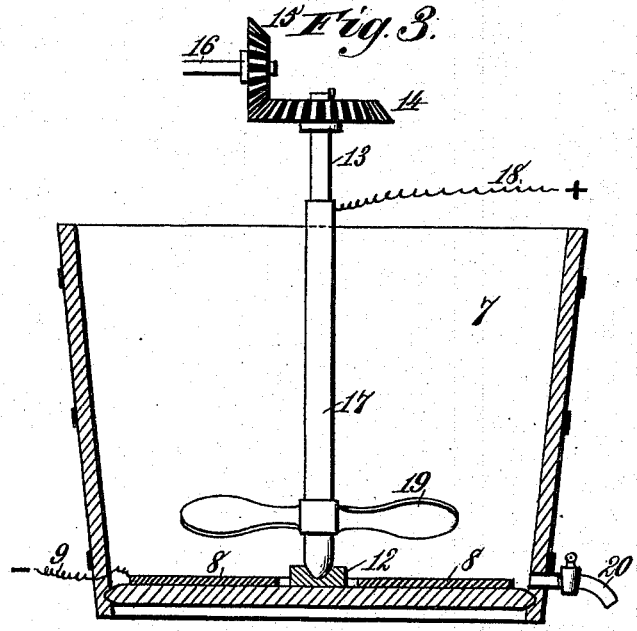
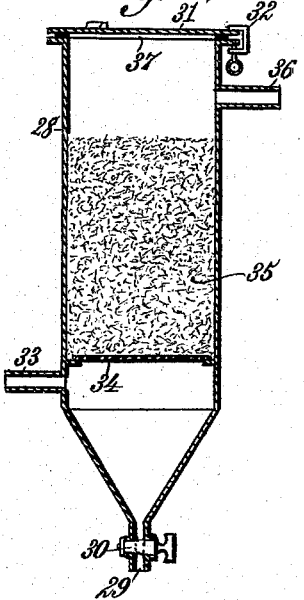
Witnesses.
Robert Everett
Thos. A. Green
Inventors.
Louis Pelatan.
Fabrizio Clerici.
By James L. Norris.
Atty.

UNITED STATES PATENT OFFICE.

LOUIS PELATAN, OF PARIS, FRANCE, AND FABRIZIO CLERICI, OF MILAN, ITALY.

EXTRACTING GOLD FROM ITS ORE.

SPECIFICATION forming part of Letters Patent No. 528,023, dated October 23, 1894.

Application filed July 18, 1894. Serial No. 517,941. (No model.)

*To all whom it may concern:*

Be it known that we, LOUIS PELATAN, a citizen of the French Republic, residing at Paris, France, and FABRIZIO CLERICI, a subject of the King of Italy, residing at Milan, Italy, have invented new and useful Improvements in the Extraction of Gold from its Ores, of which the following is a specification.

Our invention relates to the extraction of gold from its ores, our purpose being to provide a novel improvement in the art of treating both free milling and refractory ores, whereby we secure results of great importance by largely increasing the yield of gold from each ton of ore treated in accordance with our invention.

The methods of treating free milling, auriferous and argentiferous ores by amalgamation, prior to our invention, have been able to produce no greater yield than sixty (60) per cent. or thereabout of the precious metal, the remainder, amounting to forty (40) per cent. of the whole quantity of gold present in the ore, being carried away and lost, partly in the form of float gold, which passes off with the water, while a further portion is lost with the tailings. So far as we are aware, no treatment has, as yet, been discovered by which this loss may be practically and entirely avoided. As regards refractory ores, the various processes of amalgamation have, prior to our invention, produced negative results, only.

It is the object of our invention to provide means whereby the separation and collection of the precious metals may be rapidly and economically effected, and whereby an increased yield of said metals may be obtained by avoiding the loss heretofore incurred, the invention being applicable to ores of either of the two classes mentioned, whereby the loss, or waste, referred to shall be avoided, and all, or substantially all, the precious metal contained in the ore shall be obtained.

To this end our invention consists, in the apparatus, or mechanism, which is fully described hereinafter and then particularly pointed out and defined in the claims which conclude this specification.

To enable those skilled in the art to which our said invention pertains to fully understand and practice the same, we will describe said invention in detail, reference being had for this purpose to the accompanying drawings, in which—

Figure 1 is a view partly in vertical section illustrating an installation suitable for our purpose. Fig. 2 is a sectional view of the same, the section being taken in a plane at right angles to that in Fig. 1, looking toward the battery of stamps. Fig. 3 is a detail section showing the construction of the cyanide-amalgamators. Fig. 4 is a similar view of one of the precipitating and collecting vessels.

The reference-numeral 1, in said drawings, indicates a stone-crusher, of any known or preferred form, which is so arranged upon a suitable base 2 that its chute 3 may conduct the broken ore directly to a battery of stamps 4, which is organized in any familiar manner. From the stamps the ore passes to copper amalgamated plates 5, in which the coarse gold is collected while the sludge, which contains, in very many cases, fully forty per cent. of the precious metals passes from the plates 5 to a chute 6, through which it is carried. This chute is arranged above a series of vessels 7 which we term cyanide amalgamators, provision being made by which a suitable quantity of sludge may be discharged into each vessel. These cyanide amalgamators, or vats, 7 are preferably of circular form and constructed of wood or other suitable material, the bottom of each being covered by a circular copper-amalgamated plate 8, which is connected by a wire 9 to the negative pole of a battery, or dynamo 10. In the center of said plate is an opening, in which is placed a bearing 12, electrically isolated from said plate, and supporting a vertical shaft 13 which rises above the vat and is provided with a bevel gear 14. Each of these gears meshes with a bevel gear 15, mounted on a shaft 16 which is driven by any suitable power. A tube 17, formed of zinc, surrounds the shaft 13 and is connected by a wire 18 to the positive pole of the battery or dynamo 10, to provide a positive electrode, or anode, of an electrolytic cell, in which the plate 8 forms the cathode. Upon the lower part of the shaft is an agitator 19, formed of zinc and in electrical contact with the tube 17. This agitator resembles, in form, a screw propeller, its function being to thoroughly commingle and stir the contents of the vat and keep the same in active circulation, said agitator also forming part of the electrode, or anode, of which the tube 17 is a portion. An outlet 20 is placed near the bottom, to permit the discharge of its contents.

Each cyanide amalgamator 7 contains a solution of cyanide of potassium having a strength of not more than one tenth of one per cent. As this solution is too weak to generate a current through the mass in the vat, by decomposition of the electro-positive element sodium chloride or carbonate, is added until the solution has a strength of about two per cent. The shafts 13 being set in motion the precious metals in the sludge are separated by the solvent power of the solution, and current being supplied from the dynamo 10, this solvent action is aided by electrolysis, and, to a considerable extent, and the products of these reactions so far as they are separated out from the cyanide solution are deposited on the copper amalgamated plate, or negative electrode 8. The process is continued for about two hours and the sludge is then run off to a filtration tank 21, arranged beneath the vats 7.

The filtration tank contains any suitable filtering material 22, it being preferably formed of cocoamat, beneath which is a false bottom 23, suitably perforated and extending over a chamber 24. This chamber communicates with a pipe 25, which is led to any suitable exhaust-apparatus, such as a vacuum-pump 26, by which the operation of filtering is materially expedited. The clear filtered fluid which may still hold in solution a small quantity of the precious metals, which has escaped the action of the amalgamator, is carried by a pipe 27 to vessels 28, where the precious metals are precipitated and recovered.

The precipitating and collecting vessels 28 are cylindrical in form and constructed of lead, their lower ends being preferably contracted or conical, though this construction is not an indispensable feature of our invention. Outlets 29 are provided at the bottom of each vessel having cocks 30. Each vessel has a cover 31, fastened by a screw-clamp 32, to exclude the atmosphere. The filtered fluid enters by way of a pipe 33, which communicates with the pipe 27, and flowing through a perforated diaphragm 34, of lead, arranged above the conical lower end of the vessel, it flows through a mass of aluminium turnings 35, resting on said diaphragm, and passes by way of a pipe 36 to the next vessel 27, where it pursues a similar course. The gold held in solution in the filtered fluid is precipitated upon the aluminium by contact therewith and adheres in the form of a finely divided powder which gradually passes to the lower end of the vessel where it collects. It is removed therefrom from time to time by the outlets 29 and cocks 30. As the filtered fluid is driven through the vessels 28 under atmospheric pressure, the covers 31 should be provided with some suitable form of packing, such as a rubber gasket 37.

In treating refractory ores, they are first reduced to a finely divided condition by dry stamping, or in any other suitable manner. The powdered ore is then mixed with water to the consistency of a fluent sludge, with which is mingled not more than one tenth of one per cent. of potassium cyanide. This solution is preferably prepared in vessels 38, arranged above the vats 7. From this point the process follows the course already explained in connection with the treatment of free milling ores. If the filtered fluid, after passing through the vessels 28 is found to contain any material proportion of potassium cyanide, it may be run into a reservoir 39 where the strength of the solution may be restored, after which it is returned to the vessels 38 and reused.

Our invention is adapted to ores of all kinds and for this reason accomplishes an important economy, as it saves the cost of a second installation. In dealing with free milling ores it recovers from thirty to forty per cent. of the gold which has heretofore been lost, partly in the form of float gold and partly in the tailings from the amalgamators. In treating refractory ores it recovers almost, if not quite all the gold present in the ore, at an outlay of expense considerably below that involved in practicing any process heretofore employed.

The structure sheltering the apparatus requires no description, as it is of any familiar form. It may be provided with tanks, or reservoirs 40 and 41, for containing water, or for storing any fluid used.

What we claim is—

1. In the treatment of gold and silver ores, the apparatus described for dissolving amalgamating and separating the precious metals from their ores, said apparatus consisting of a crusher, an amalgamator, a dissolving apparatus comprising a vessel having an inner bottom of amalgamated copper or other suitable metal connected by wire to one pole of a generator of electricity, a central shaft having a surrounding pipe of zinc, an agitator of like material mounted thereon and connected by wire to the other pole of said generator means for revolving the shaft, the vessel being provided with an outlet, a filtration apparatus, a connected series of reciprocating and collecting vessels containing a metallic precipitating agent and means for creating a vacuum beneath the filter, to drive the solution into the precipitating vessels under pressure, substantially as described.

2. The combination with a crushing mechanism and an amalgamator, of a series of vessels containing a solution of cyanide of potassium and a salt of sodium each vessel having an amalgamated copper bottom connected to one pole of a generator of electricity and a central shaft having a zinc pipe and agitator connected to the other pole, a filter, a series of communicating closed vessels of lead, each containing a body of aluminum chips resting on a perforated diaphragm above the inlet and rising nearly to the outlet, and means for creating a vacuum beneath the filter to drive the fluid through and into the series of lead vessels under pressure, substantially as described.

In testimony whereof we have hereunto set our hands and affixed our seals in presence of two subscribing witnesses.

LOUIS PELATAN. [L. S.]
FABRIZIO CLERICI. [L. S.]

Witnesses:
JAMES L. NORRIS,
THOS. A. GREEN.